United States Patent
Wood

(10) Patent No.: US 7,796,082 B2
(45) Date of Patent: Sep. 14, 2010

(54) METHODS AND APPARATUS FOR LOG-FTC RADAR RECEIVERS HAVING ENHANCED SEA CLUTTER MODEL

(75) Inventor: Thomas E. Wood, Portsmouth, RI (US)

(73) Assignee: Raytheon Company, Waltham, MA (US)

( * ) Notice: Subject to any disclaimer, the term of this patent is extended or adjusted under 35 U.S.C. 154(b) by 82 days.

(21) Appl. No.: 11/672,813

(22) Filed: Feb. 8, 2007

(65) Prior Publication Data

US 2008/0191929 A1    Aug. 14, 2008

(51) Int. Cl.
   G01S 7/292    (2006.01)
   G01S 7/285    (2006.01)
   G01S 13/00    (2006.01)
   G01S 7/02     (2006.01)

(52) U.S. Cl. .............. 342/205; 342/26 R; 342/89; 342/159; 342/175; 342/195

(58) Field of Classification Search ...... 342/26 R–26 D, 342/89–103, 159–164, 175, 195, 196, 205, 342/200–204
See application file for complete search history.

(56) References Cited

U.S. PATENT DOCUMENTS

| | | | |
|---|---|---|---|
| 4,684,950 A | 8/1987 | Long | |
| 5,177,487 A * | 1/1993 | Taylor et al. | 342/159 |
| 5,327,141 A * | 7/1994 | Sheldon | 342/159 |
| 5,337,055 A * | 8/1994 | Ghignoni | 342/93 |
| 5,451,961 A * | 9/1995 | Rubin et al. | 342/159 |
| 5,546,084 A * | 8/1996 | Hindman | 342/161 |
| 5,546,089 A * | 8/1996 | Talbot | 342/159 |
| 5,576,712 A * | 11/1996 | Bian et al. | 342/160 |
| 5,686,919 A | 11/1997 | Jordan et al. | |
| 5,754,140 A | 5/1998 | Starr et al. | |
| 5,900,835 A * | 5/1999 | Stein | 342/159 |
| 6,038,526 A * | 3/2000 | Stein | 342/159 |
| 6,130,639 A * | 10/2000 | Agnesina et al. | 342/195 |
| 6,188,350 B1 * | 2/2001 | Neumerkel et al. | 342/159 |
| 6,911,933 B1 * | 6/2005 | Mutz et al. | 342/159 |
| 7,006,031 B1 * | 2/2006 | Abatzoglou et al. | 342/159 |
| 7,079,991 B2 * | 7/2006 | Li et al. | 342/161 |

FOREIGN PATENT DOCUMENTS

WO    WO95/13547    9/1994

OTHER PUBLICATIONS

N. Xie et al., "A Multiple-Model Prediction Approach for Sea Clutter Modeling"; IEEE Transactions on Geoscience and Remote Sensing; vol. 41, No. 6, Jun. 2003; pp. 1491-1502.*

K. Lu et al., "A Piecewise Parametric Method Based on Polynomial Phase Model to Compensate Ionospheric Phase Contamination"; Proceedings of ICASSP 2003, vol. II, pp. 405-408; printed in the year 2003.*

(Continued)

*Primary Examiner*—Bernarr E Gregory
(74) *Attorney, Agent, or Firm*—Daly, Crowley, Mofford & Durkee, LLP

(57) ABSTRACT

Methods and apparatus to provide Log-Amp-detected radar sea clutter voltage modeled by a polynomial, such as a cubic polynomial, and using that model as a basis for sea clutter reduction filtering. In an exemplary embodiment, a navigational radar includes an STC filter design based on the cubic sea clutter modeling.

20 Claims, 17 Drawing Sheets

OTHER PUBLICATIONS

K. Lu et al., "Ionospheric Deconatamination and Sea Clutter Suppression for HF Skywave Radars"; IEEE Journal of Oceanic Engineering; vol. 30, No. 2, Apr. 2005; pp. 455-462.*
Notification of transmittal of the International Search Report dated Aug. 26, 2008, PCT/US2008/053261.
The International Search Report, Priority date Feb. 8, 2007, PCT/US2008/053261.
Written Opinion of the International Searching Authority, Priority date Feb. 8, 2007, PCT/US2008/053261.
Notification Concerning Transmittal of International Preliminary Report on Patentability (Chapter 1 of the Patent Cooperation Treaty), PCT/US2008/053261 dated Aug. 20, 2009, 2 pages.
Written Opinion of the International Searching Authority, PCT/US2008/053261 dated Aug. 20, 2009, 7 pages.

* cited by examiner

METHODS AND APPARATUS FOR LOG-FTC RADAR RECEIVERS HAVING ENHANCED SEA CLUTTER MODEL

BACKGROUND OF THE INVENTION

As is known in the art, major ocean-going ships, civilian and military, have been using radars for navigation and collision avoidance for many decades. These radars display land masses, buoys, and other ships. At closer ranges and in heavier weather, sea surface return interferes with the ability to easily detect the objects the radar is designed to see. Mathematical models of sea clutter have been developed that aid in filter design, e.g., sensitivity time control (STC), to reduce the sea clutter without adversely affecting the primary performance of the radar. As is known in the art, STC is used to attenuate relatively strong signal returns from ground clutter targets in the first few range gates of the receiver. Without attenuation of such signals, the receiver would generally saturate due to the strong signal return.

The mathematical modeling of radar sea clutter has a long history. For example, one notoriously well known text discussing radar and sea clutter is Skolink, Merrill I., "Introduction to Radar Systems," and particularly the discussion of Log-FTC receivers (McGraw-Hill, NY, 1984, pp 486-489). A more modern mean sea clutter model is provided in Barton and Ward, "Handbook of Radar Measurements," Artech House, NY, 1985 (pp. 137-148). There are two complementary aspects to classic sea clutter modeling. The first aspect is the modeling of the clutter fluctuations from sample to sample. Usually, such fluctuations are modeled by a stationary stochastic process with a probability density function (pdf) that may differ significantly from author to author. A second aspect of sea clutter modeling is the nature of the mean clutter levels as a function of range.

There are disadvantages of conventional sea state modeling. For example, a reflectivity index is used in sea clutter modeling, however, this index has certain limitations. Reflectivity indexes are derived from averaging over many sea environments, many different wavelengths, and many wind aspects. In addition, below a critical grazing angle, further correction is required. Attempts to base STC on conventional sea clutter models have resulted in less than exemplary performance at short range while maintaining optimal performance at longer ranges. In the present, where there is more attention on relatively close targets/threats, where such targets can be quite small, improved STC filtering is very desirable.

SUMMARY OF THE INVENTION

The present invention provides methods and apparatus for sea clutter modeling using a cubic polynomial. With this arrangement, sensitivity time control can reduce sea clutter as compared to conventional sea clutter modeling. While the invention is primarily shown and described in conjunction with navigation radar embodiments, it is understood that the invention is applicable to radars in general in which it is desirable to model sea clutter.

In one aspect of the invention, a method comprises receiving signal return for a transmitted signal, and processing the received signal return including modeling detected sea clutter voltage with a cubic polynomial, and using the processed signal for contact data extraction and tracking.

The method can further include one or more of the following features: displaying the processed signal, the cubic polynomial includes coefficients corresponding to physical parameters, the cubic polynomial model $C(r)$, where r is range, for navigation sea clutter voltage is a cubic with a $3^{rd}$ order solution to the equation $C(r)=\mu$, wherein $\mu$ is mean receiver noise level:

$$C(r) = \mu + \frac{(\xi - \mu)}{h^3}(h-r)^3,$$

where, $\mu, \xi$, and h are all non-negative, the maximum range extent of sea clutter is represented by h, $\mu$ is the mean receiver noise level, and $\xi=C(0)$ is the maximum clutter return, truncation of the cubic polynomial at a point h, where sea clutter meets mean noise level, changing one or more of the coefficients based upon sea state information, altering h based upon wind information, the cubic polynomial has the form $C(r)=(a+b\ r+cr^2)\ (d-r)$, where the quadratic term is irreducible, providing four-parameter sensitivity time control (STC) in which three parameters correspond to the three polynomial coefficients and a fourth parameter corresponds to an attack point, which is a function of attenuation and detection sensitivity, performing subtractive STC, performing attack-point-based multiplicative STC, and displaying via plan position indicator.

In another aspect of the invention, a system comprises a radar including a signal processing module and a sea clutter modeling module to model sea clutter voltage with a cubic polynomial for contact data extraction and tracking.

BRIEF DESCRIPTION OF THE DRAWINGS

The exemplary embodiments contained herein will be more fully understood from the following detailed description taken in conjunction with the accompanying drawings, in which.

DETAILED DESCRIPTION

Figure 1:
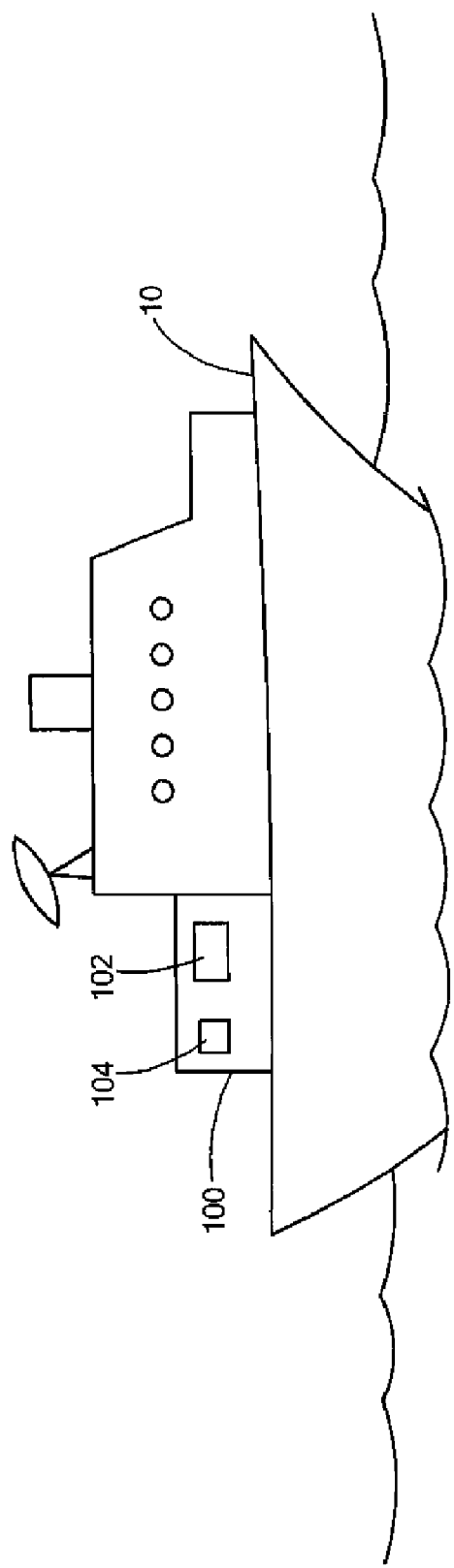
FIG. 1 is a schematic depiction of a radar system having a sea clutter model module in accordance with exemplary embodiments of the invention.

FIG. 1 shows an exemplary radar system 100 having sea clutter modeling in accordance with exemplary embodiments of the invention. The radar system 100 can be located on a vehicle 10, such as a ship, or at a fixed location. The radar system 100 includes a signal processing module 102 and a sea clutter module 104 to provide sea clutter modeling using cubic, or higher order, polynomials, as discussed in detail below.

In general, exemplary method and apparatus embodiments of the present invention include sea clutter modeling related to the nature of mean clutter levels as a function of range, referred to as the range profile. With the inventive sea clutter modeling, sensitivity time control (STC) filtering can be simplified without adversely impacting radar performance.

Figure 2:
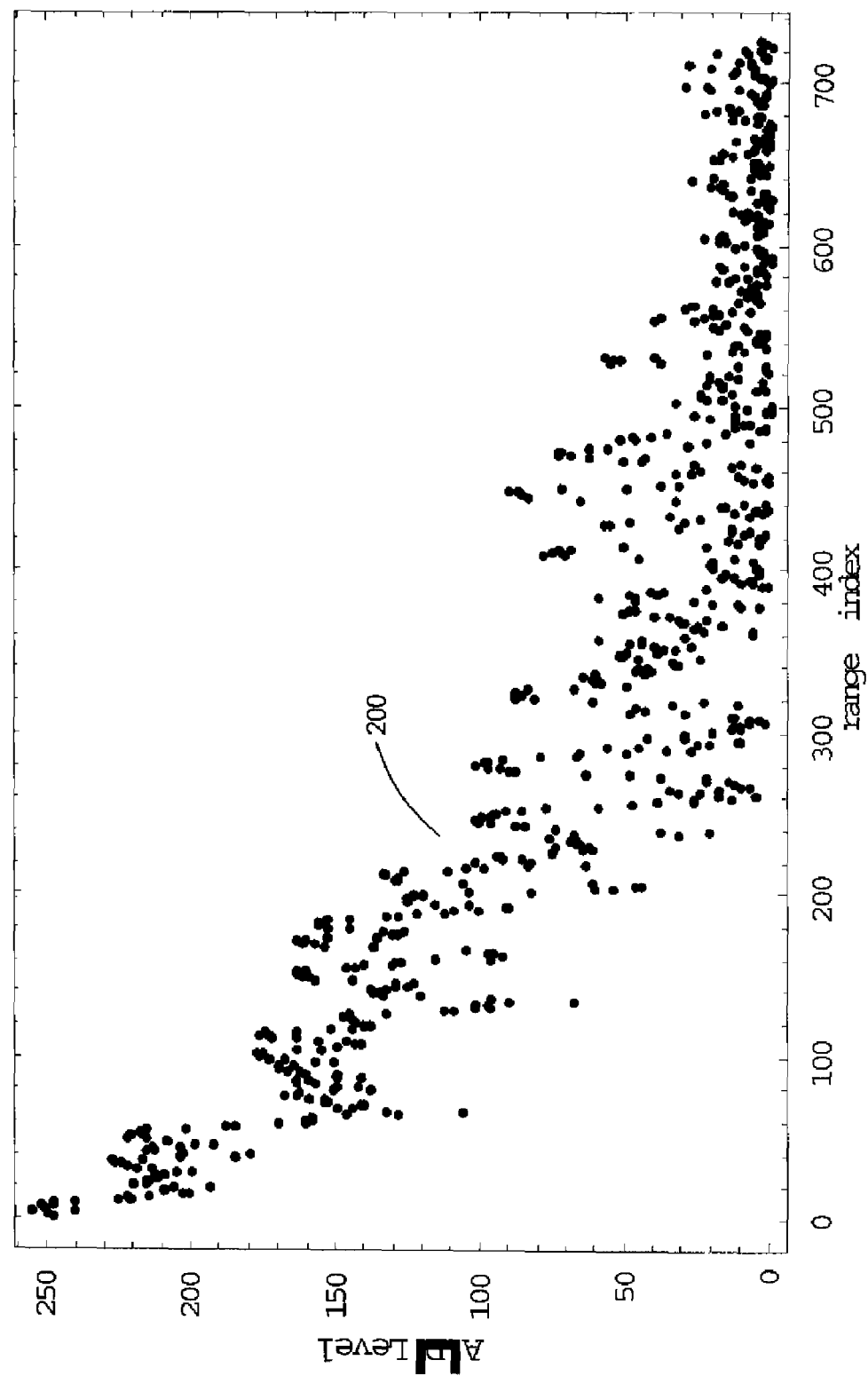
FIG. 2 is a graphical depiction of a single PRI sea clutter range profile limited to about three Miles.

FIG. 2 provides an example of data for a single pulse repetition interval (PRI) sea clutter range profile 200 limited to about three miles captured using a conventional shipboard navigation radar on a calm day. The x-axis is indexed by range bin number where each range bin represents about 7.5 meters. The y-axis is in digital levels provided by an 8 bit analog-to-digital converter (ADC). The 8-bit ADC provides digital values from 0 to 255 that are proportional to the radar's receiver voltage following a Log Amp.

Figure 3:
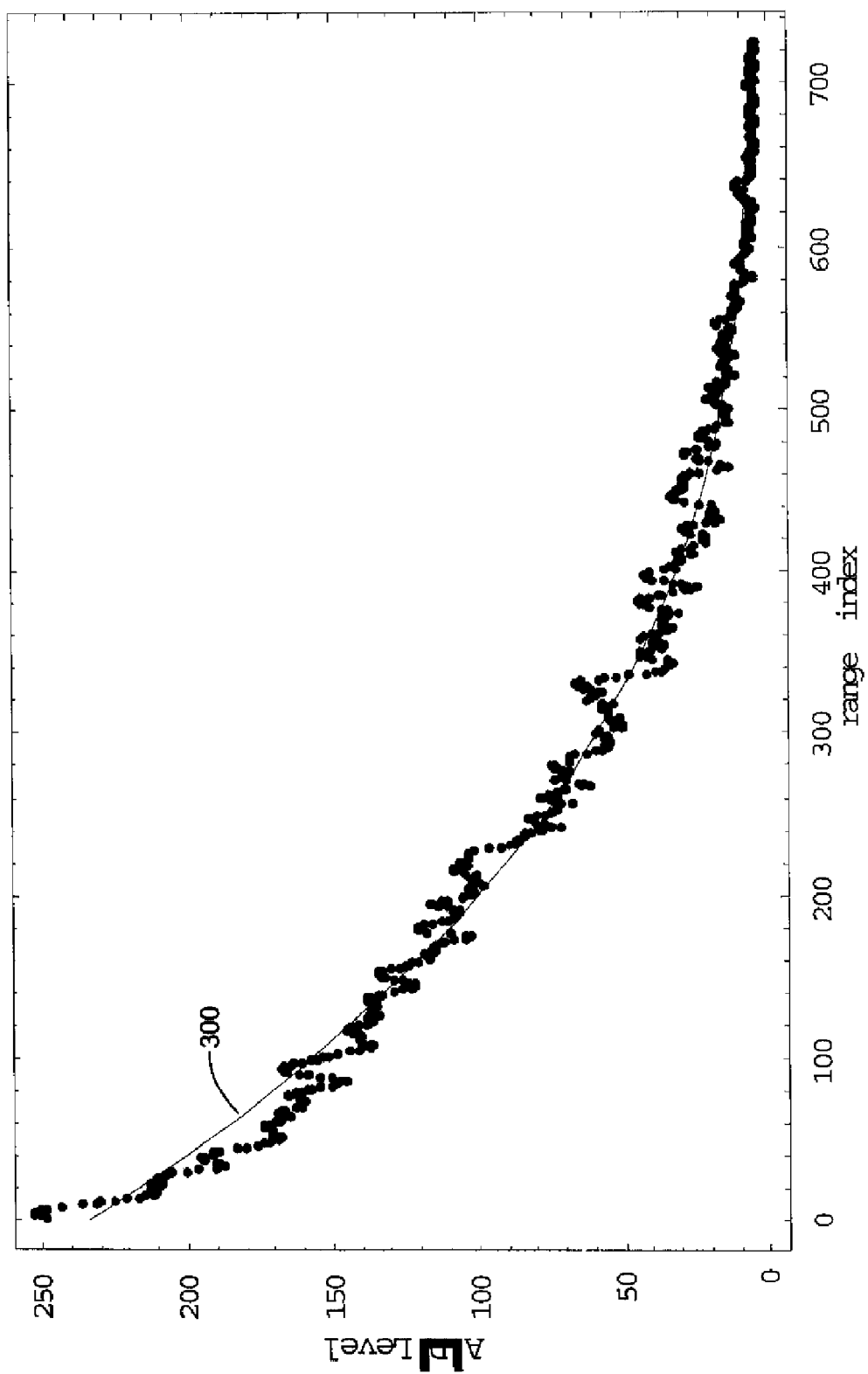
FIG. 3 is a graphical depiction of a cubic polynomial fit to mean sea clutter range profile.

FIG. 3 shows a range profile 300 by averaging the range profiles 200 of the type in FIG. 2 from many individual pulses. The significant fluctuations from range bin to range bin are smoothed, and an analytic function can be fitted to the data with desired effects for radar filter design.

The cubic polynomial that best fits, in the least mean square sense, the range profile in FIG. 3 is:

$$C(r)=225-0.8\ r+0.001\ r^2-4\times10^{-7}\ r^3.$$

$C(r)$ factors into a linear term and an irreducible quadratic:

$$C(r)=4\times10^{-7}(986-r)(5.7\times10^5-1464\ r+r^2).$$

It should be noted that the precision of the coefficients was not overly emphasized and that the discriminant of the quadratic term is barely negative. Tools well known to one of ordinary skill in the art, such as computer programs featuring symbolic programming language for numerical, symbolic and graphical computation, including MATHEMATICA® software by WOLFRAM RESEARCH, INC. CORPORATION Champaign ILL., can be used to fit the data to a polynomial and reduce it in a manner readily apparent to one skilled in the art.

It is understood that the determination of all coefficients to a high degree of precision is not required. Application of this sea clutter model reduces clutter on the radar display (e.g., Plan Position Indicator (PPI)) via sensitivity time control (STC) processing, as described more fully below. In an exemplary STC implementation, we expect to keep the coefficients constant in the range profile model over relatively long periods of time depending on weather changes or operator changes in the radar settings. However, with such changes in sea state or in radar settings, the coefficients can be changed, while the general form of the cubic model may not.

At some relatively long distance, the sea clutter echo strength becomes weaker than the noise in the receiver. Receiver noise has a constant mean level. The more of the range profile that is included from the far ranges where noise dominates clutter, the more the fitting process will try to achieve a flat behavior at these longer ranges.

Cubics can approximate this flat behavior by having a low-amplitude "wiggle." The success by this wiggle in achieving a good fit will affect the location of the root of $C(r)$ as well as the coefficients of the quadratic factor. By demanding that the sea clutter model remain positive until it reaches (and stays below) the noise level, one concludes that such a cubic model must have an irreducible quadratic factor. To avoid the "wiggle" entirely, it is better to model over a restricted range by chopping the profile just as clutter levels reach the noise level. Then the wiggle is not necessary to stretch out the flatness at longer ranges.

To account for the flatness at the constant noise level $\mu$, in one embodiment we force as many derivatives as possible of $C(r)$ to be zero at the range where $C(r)=\mu$. This reduces the number of parameters in the clutter model from four to three, and these three parameters have physical interpretations, as discussed more fully below.

Some discussion of navigation radar is now provided regarding the radar sea clutter models and how they impact the radar filter designs. A significant function of shipboard navigation radars is to refresh a Plan Position Indicator (PPI) every time the antenna rotates 360 degrees at either 20 or 40 RPMs (revolutions per minute), for example. This provides the operator a so-called bird's eye view of the surrounding land, buoys, and ships, that is updated every couple of seconds.

Figure 4A:
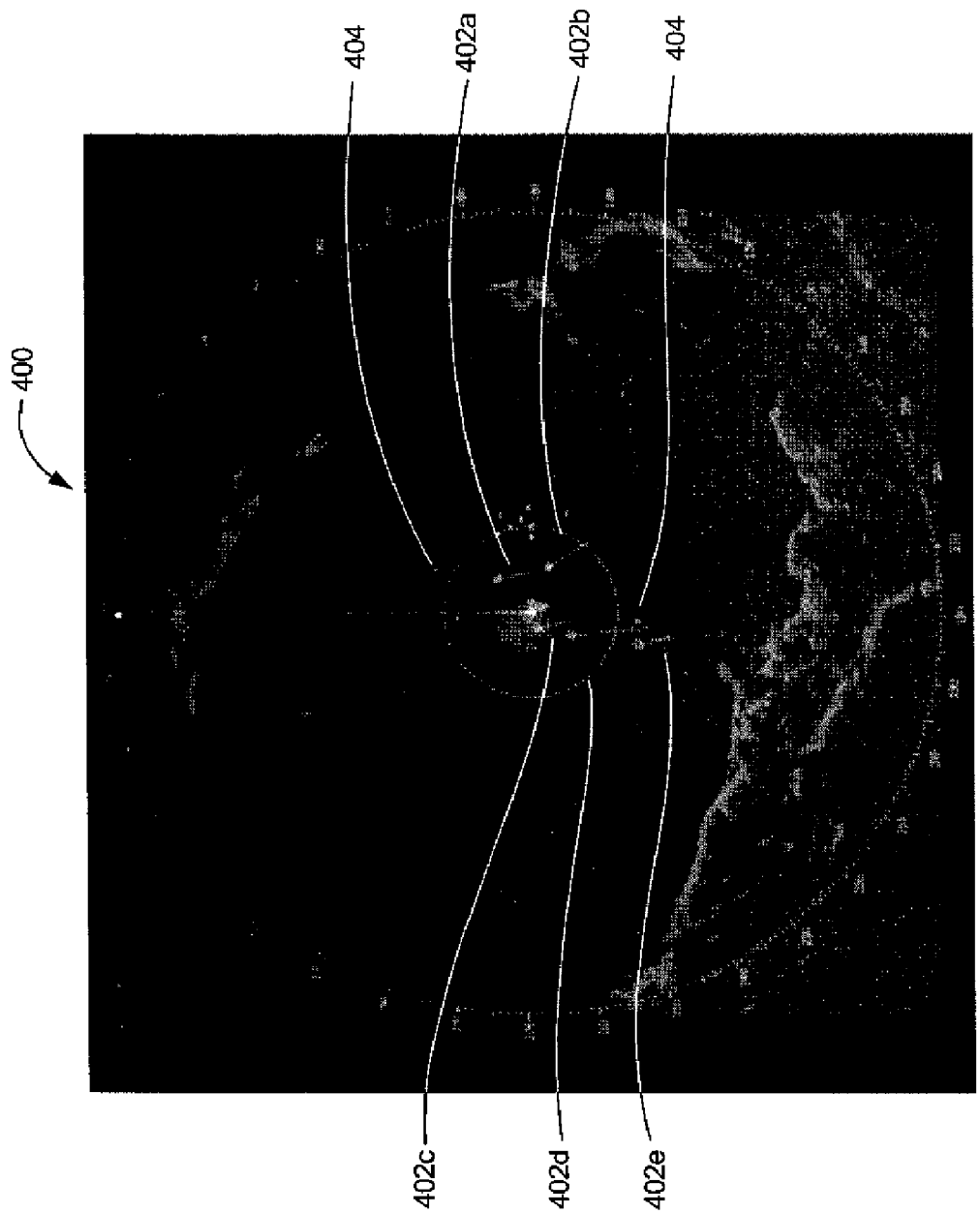
FIG. 4A is a pictorial representation of a navigation Radar PPI with noise speckle and residual sea clutter.
Figure 4B:
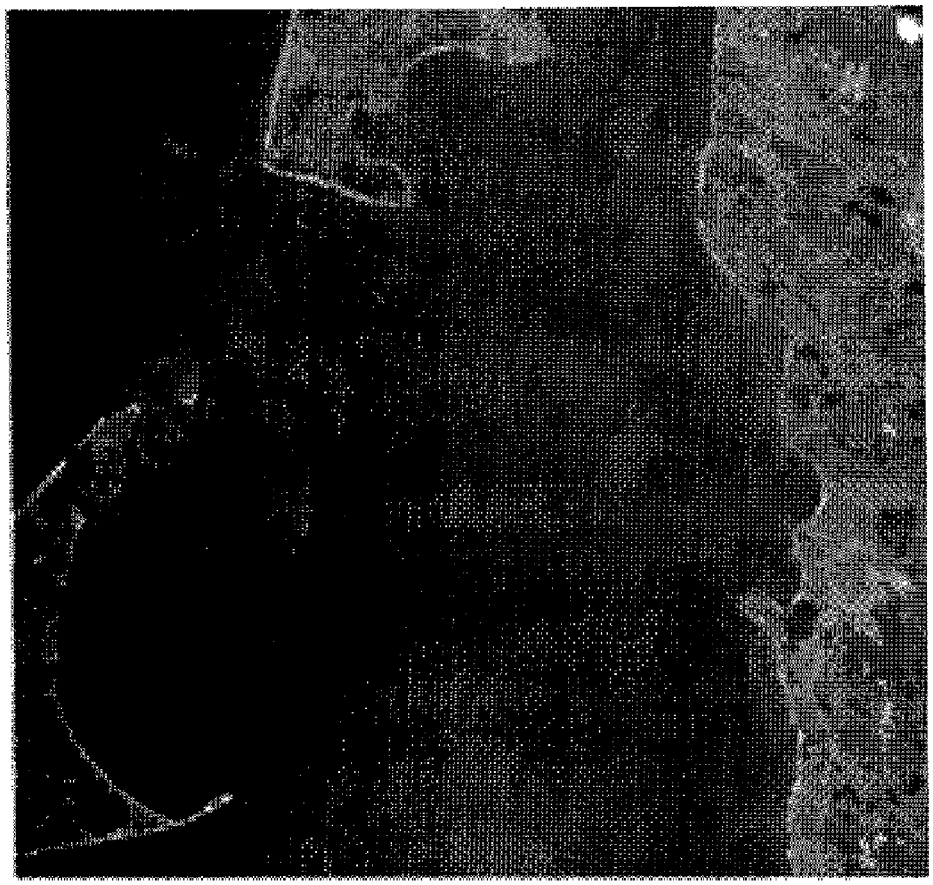
FIG. 4B is a pictorial representation of a satellite view of Nantucket Sound.

FIG. 4A shows a snapshot 400 of a navigation radar PPI and FIG. 4B shows a satellite view 450 of the same scene. Note that the airborne radar community refers to the PPI as a Real Beam Ground Map (RBGM). Generally speaking, inventive sea clutter mean range profile model embodiments may not be especially useful to the airborne radar community since such radars may have different characteristics and are often not designed for detection at relatively short ranges (e.g., in the first few tens of meters away from the radar antenna).

Another function of navigation radar is to automatically detect and track a discrete object in the radar scene. If these objects in track present a collision potential for the ship, the radar system provides a warning via an audible alert. For example, FIG. 4A shows five targets 402a-e in track as graphic circles with velocity vectors or "leaders" all near the radar. The graphic symbols marked by "+" 404 in the PPI are discrete objects that the radar detected, but that the operator chose not to put into track.

The effect of imperfect sea clutter processing can be seen by observing what is inside the circle at the center of FIG. 4A. It can be seen that the noise background (a.k.a., speckle) over the water has been attenuated inside the circle. The attenuation reduced the amount of sea clutter while still allowing the system to track the nearby boats. However, there is still significant bright residual sea clutter very near ownship, especially forward and to port as the ship sailed toward Nantucket Island in Massachusetts.

Navigation radars for large ocean-going ships are mandated by international treaty to meet specifications by the International Electrotechnical Commission (IEC). We summarize such radar characteristics by providing numerical values that are valid for the data we provide herein. The values are typical for such commercial radars.

| | |
|---|---|
| Radio Frequency (RF): | 9.41 GHz |
| Antenna Gain: | 31 dB |
| Antenna Azimuth Beamwidth: | 0.95° |
| Antenna Vertical Beamwidth: | 21° |
| Antenna Polarity: | Horizontal |
| Antenna Height Above Water: | 20 m |
| Transmit Peak Power: | 25,000 Watts |

The system uses any of five selectable waveforms:
Pulsewidth (nanoseconds), PRF (HZ) Pairs:
(80 ns, 2200 Hz) (200, 2200) (400, 1800) (700, 1028) (1200, 600)

The profiles in FIGS. 2 and 3 were collected using the 200 nanosecond pulsewidth and the 2200 Hz PRF. We averaged 189 PRI to obtain FIG. 3. (Note: PRF stands for Pulse Repetition Frequency and PRI is Pulse Repetition Interval: PRF=1/PRI). Data was collected using other pulsewidth modes and at other comparable antenna installations on different days. The collected data provided similar results.

We tried to collect the data with the least amount of signal processing that was possible. The radar from which we collected the data is capable of significant performance enhancing filters that would largely remove the sea clutter while maintaining the ability to detect small boats and land masses. Where processing could not be disabled, we set controls to minimize effects. These effects might arguably affect the sea clutter pdf, but there could not have been any appreciable impact on the mean sea clutter range profile.

Figure 5:
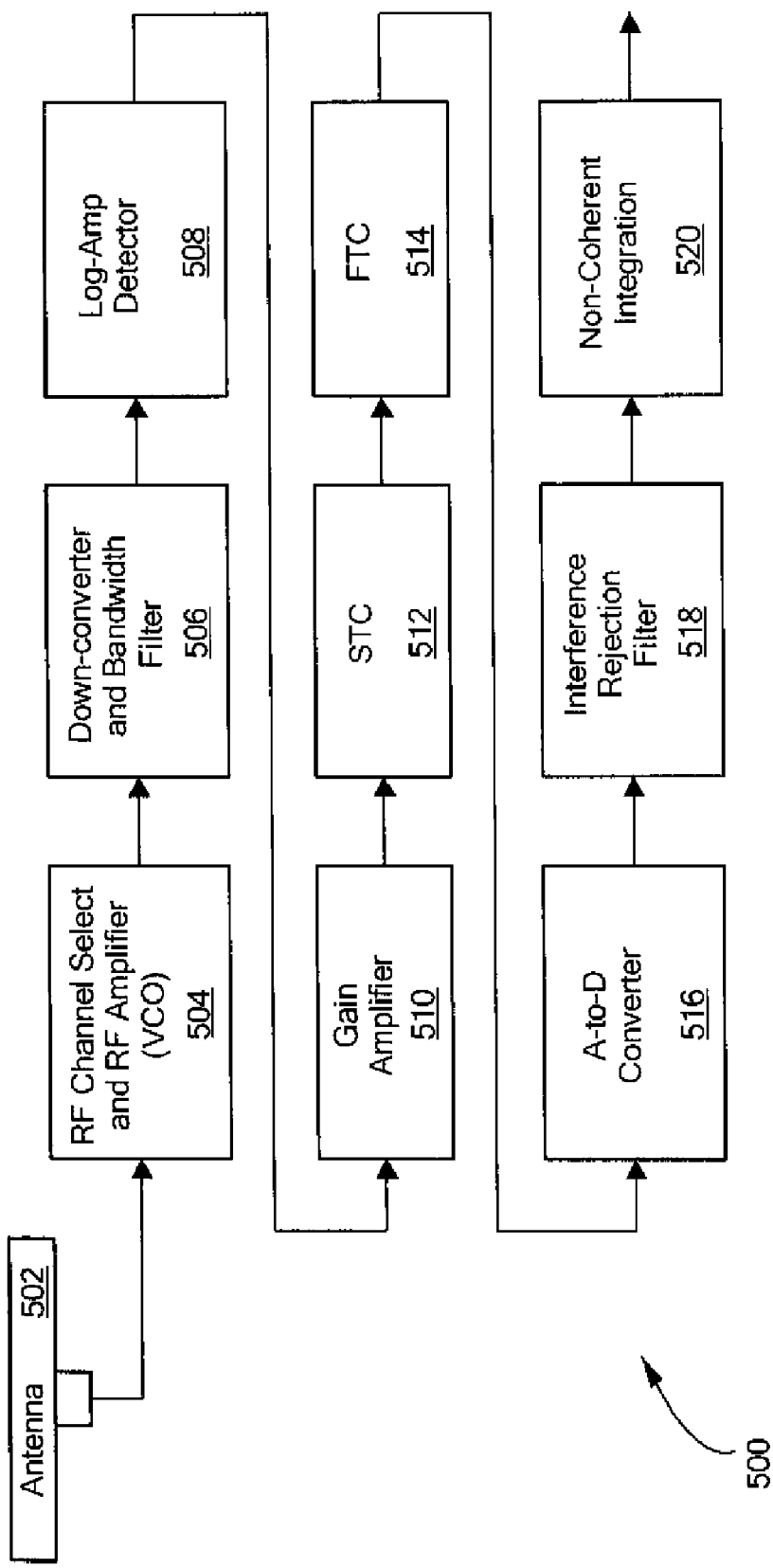
FIG. 5 is a block diagram of a prior art radar receiver processing module to collect data.

A high-level view of conventional navigation radar receiver processing 500 is provided in FIG. 5. This type of data process flow and radar configuration was used to collect data. It is understood that the various processing elements can be placed in different orders with differing characteristics. The antenna 502 collects the reflected energy from the transmitted radar pulses, but it can also collect RF energy from interfering sources. It has some interference rejection capability, such as a horizontal polarizer.

The RF amplifier and channel selection filter 504 restricts the signals to the desired RF frequencies. Most navigation radars are at 9.41 GHz (X-Band) or within a few tens of MegaHertz from there. There is another RF frequency near 3.01 GHz (S-Band) allocated to maritime radar. The RF filter at the beginning of the receiver processing is quite narrow, but the center of the receiver channel can be adjusted by means of a Voltage Controlled Oscillator (VCO) to account for transmitter frequency drift, which can be caused by age, temperature, tolerances in manufacturing, etc.

The down-converter 506 functions to filter away the carrier frequency so that remaining fluctuations in the signal represent variations in echo amplitude. Low filter bandwidth here will smooth out sea clutter and correlate noise samples. The logarithmic amplifier (log-amp) 508 is a non-linear device used to compress the signal into a small voltage range. A gain amplifier 510 can be used to amplify the signal from the log-amp 508. The range of signal strengths expected in navigation radar is quite large. The difference in signal power from a small boat near the horizon and an oil tanker at a quarter mile is more than 70 dB. If v(r) is the voltage as a function of range coming into the log-amp detector 508, then the output is proportional to $V(r)=\text{Log}(1+|v(r)|)$.

Note that for relatively small input voltages, the output looks very much like the input since dV/dv is very nearly 1 when v is very nearly 0. Since receiver noise is relatively small, the noise statistics (pdf) are not changed significantly by the log-amp.

As the log-amp 508 attenuates the signal more when the signal is stronger, the log-amp tends to flatten out the sea clutter at closer ranges. If the log-amp 508 actually did flatten out the sea clutter, then a high pass filter after the log amp would "differentiate the clutter away." The high-pass filter included in typical navigation radars is known as the Fast Time Constant (FTC) filter 514.

The information in FIGS. 2 and 3 shows that the log-amp does not do enough to flatten out the clutter, so another processing step can be used to flatten it out before the FTC filtering. This additional processing step is historically called the Sensitivity Time Control (STC) filter 512. With advances in electronics, the Analog-to-Digital Converter (ADC) stage 516 is coming earlier and earlier in receiver processing, and it allows for more and more innovation in STC 512 and other processing at relatively low cost. Classic filtering with low-cost analog circuits limited the sort of range profile approximations that could be implemented in low-cost STC. With digital processing, any curve can be well-approximated to within the resolution limits of the ADC.

Interference Rejection (IR) is a filter 518 that allows multiple radars to operate on the same frequency with minimal interference. However, all transmitters on 9.41 GHz should have low duty cycles and PRFs that are randomly jittered. Then, using a PRF high enough to sample the target in the antenna main beam multiple times, the IR filter is designed to replace strong signals on an isolated single pulse by the average noise level. Without IR filters, so-called "running rabbits" show up in the PPI and can confuse the operator.

Non-coherent integration (NCI) 520 forms an average of consecutive pulses to smooth out noise (and clutter). However, since sea clutter is highly correlated from pulse to pulse, NCI is relatively ineffective. Typically, we can get about ten pulses on a small target while the one degree wide azimuth antenna beam sweeps over it. Ten PRIs is about five to twenty milliseconds. Most studies show that more like 500 milliseconds of averaging is needed to de-correlate and remove sea clutter fluctuations. NCI is adequate for long-range performance of the radar (beyond sea clutter), but is limited in improving short-range performance.

As is known in the art, the classic mean sea clutter range profile models start with the radar range equation (a.k.a, the r-to-the-fourth equation.) This model says that the radar signal echo power (Watts) will be proportional to $$\frac{PG^2(a,r)[\sigma^0(r)A(r)]}{r^4}.$$

where "P" stands for the radar peak power, G(a,r) is the antenna gain, and G depends on the installed antenna height "a" and the depression angle from the horizontal plane at the antenna to the sea surface at the given range "r". The term in square brackets is the sea clutter strength broken into two factors: the reflectivity index $\sigma^0$, and; the sea surface area A sampled by the radar at range r.

In a typical conventional navigation radar, P is a constant 25 kW. G is known with some fidelity to have the shape of a Gaussian pdf with a bump about 21 degrees wide at the half-power level. G is often not well known to a very high precision especially outside an angle a few tens of degrees centered on the peak gain. Since at short ranges the depression angle to sea clutter is near 90° down from horizontal (an angle where there is no transmission):

$$\lim_{r \to 0} G(a, r) = 0.$$

Furthermore, $$\lim_{r \to horizon} G(a, r) = G_{max} = 31 \text{ dB}.$$

Our installations have had antenna heights near 20 meters. At such short heights, we can treat the Earth as flat and say that the range at which the antenna Gain is within half power is 20/sin(10.5°) or about 110 meters. Once we are looking well beyond 100 meters, the gain pattern G(a, r) is very slowly varying, i.e., it will not contribute much to the curvature of the clutter's range profile.

A(r) is modeled as an annular sector about θ=1 degree=0.017 radians wide and about Δr=7.5 meters deep in range. An annular sector's area is r×θ×Δr=0.1275 r.

$$\lim_{r \to 0} A(r) = 0.$$

Furthermore, $$\lim_{r \to horizon} \frac{A(r)}{r} = 0.1275.$$

This latter observation justifies the common practice of treating the clutter range profile as proportional to $1/r^3$ in power (or $1/r^{1.5}$ in voltage).

Another piece of the classic models is the sea clutter reflectivity index:

$$10 \text{ Log}(\sigma^0) = -64 + 6K_B + 10 \text{ Log}(\sin(\gamma)) - 10 \text{ Log}(\lambda)$$

where $K_B$ is the sea state on the Beaufort scale, γ is the grazing angle of the line of sight from the antenna to the spot at range r on the sea surface, and λ is the wavelength. In Barton and Ward, "Handbook of Radar Measurements," Artech House, NY, 1985, there is made the additional refinement of subtracting 40 Log ((critical angle)/γ) when γ<critical angle. The critical angle changes in accordance with sea state from a maximum of 1.8 degrees in calm seas and to about 0.1 degrees when waves are about 5 meters high in sea state 6. Note that the Barton and Ward model for the clutter index is constant in a given sea condition except for the term(s) involving the grazing angle. For very steep grazing angles, the index will approach a maximum value. Near the horizon, the index will approach zero, even faster as the grazing angle gets smaller than the critical angle. For ranges at and beyond the horizon, the reflectivity index is zero.

Looking critically near r=0, G(a,r) goes to zero and so does A(r), but we do not have enough information to say definitely that the numerator of the clutter power model goes to 0 fast enough to remove the singularity in $1/r^4$. It is our assertion that, for navigation radars with log-amp detectors, the voltage from sea clutter stays bounded as r goes to 0.

Navigation radar sea clutter voltage is classically modeled in two parts. The model has a smooth function in range that represents the mean clutter level. On top of that smooth range profile is added a stochastic process that has very rapid fluctuations in range. The stochastic process is correlated from pulse to pulse (azimuth) with time constants on the order of hundreds of milliseconds.

We have come to the unexpected realization that navigational radar can include a range profile for navigation radar sea clutter voltage that matches well to a cubic polynomial. Many sets of data were taken using a variety of waveforms (pulsewidths from 80 to 1200 nanoseconds), antenna heights (mostly between 10 and 40 meters), and sea conditions (mostly calm seas). The range profiles were averaged from many pulses and fit to "Laurent series" of the form:

$$F_{N,M}(r) = \sum_{p=-M}^{N} a_p r^p.$$

We eliminated terms of the Laurent series until the fit deviated from the mean clutter profile by more than the sample fluctuations. We started with fifty terms in the series and saw no appreciable reduction in accuracy as long as the four cubic terms were retained.

That a relatively small number of terms involving positive powers alone turned out to fit extremely well was unexpected. Note that we restricted the range of the fit to those ranges where sea clutter dominated receiver noise.

An arbitrary cubic of the form $f(r)=\alpha+\beta r+\delta r^2+\gamma r^3$ has four parameters. However, we noticed that the cubics that fit well to navigation radar sea clutter are not completely general. Our example in FIG. 3 is typical:

$$C(r) = 4 \times 10^{-7} (986-r)(5.7 \times 10^5 - 1464\ r + r^2).$$

We abstract this form as the following sort of cubic:

$$C(r) = (a+br+cr^2)(d-r)$$

where the quadratic term is irreducible. We have discovered that sea clutter models can be approximated satisfactorily by cubics having three parameters of the form $$g(r) = \mu + \frac{(\xi - \mu)}{h^3}(h - r)^3.$$

Moreover, the three parameters in g(r) can be connected to physical interpretations.

To see the difference in using the general cubic and the special three parameter form, set $\Delta(r)=(f(r)-g(r))^2$. The maximum difference between f and g will occur at a critical point of Δ or at the endpoints r=0 or r=h. Note that Δ'(r)=0 when either Δ(r)=0 or when f'(r)=g'(r).

Figure 6:
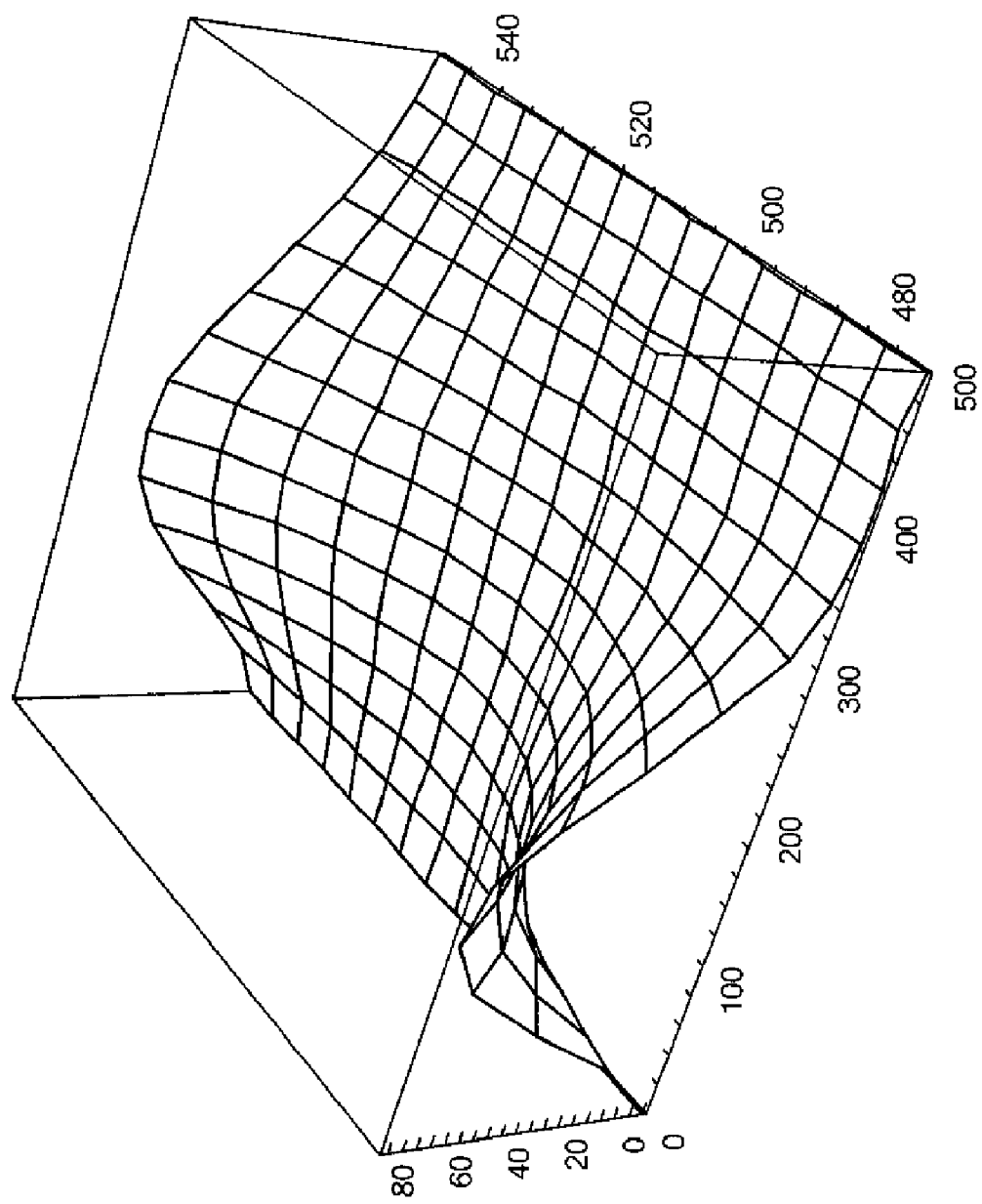
FIG. 6 is a graphical representation showing the difference between general-best-fit cubics and special cubics.

We chose not to analyze this in complete generality, but to look at specific examples of f(r) with coefficients that resulted from best fits to actual mean sea clutter range profiles. We then chose ξ=α so that g(0)=f(0) and we set μ equal to the mean receiver noise level. Then, g and Δ are left dependent on only two parameters: h and r. A three-dimensional graphic showing Δ as a function of h and r then shows how to choose h to get a uniformly best match between g(r) and f(r). For example, FIG. 6 shows a match uniformly throughout the range interval [0, 500] when we choose h around 500.

Figure 7:
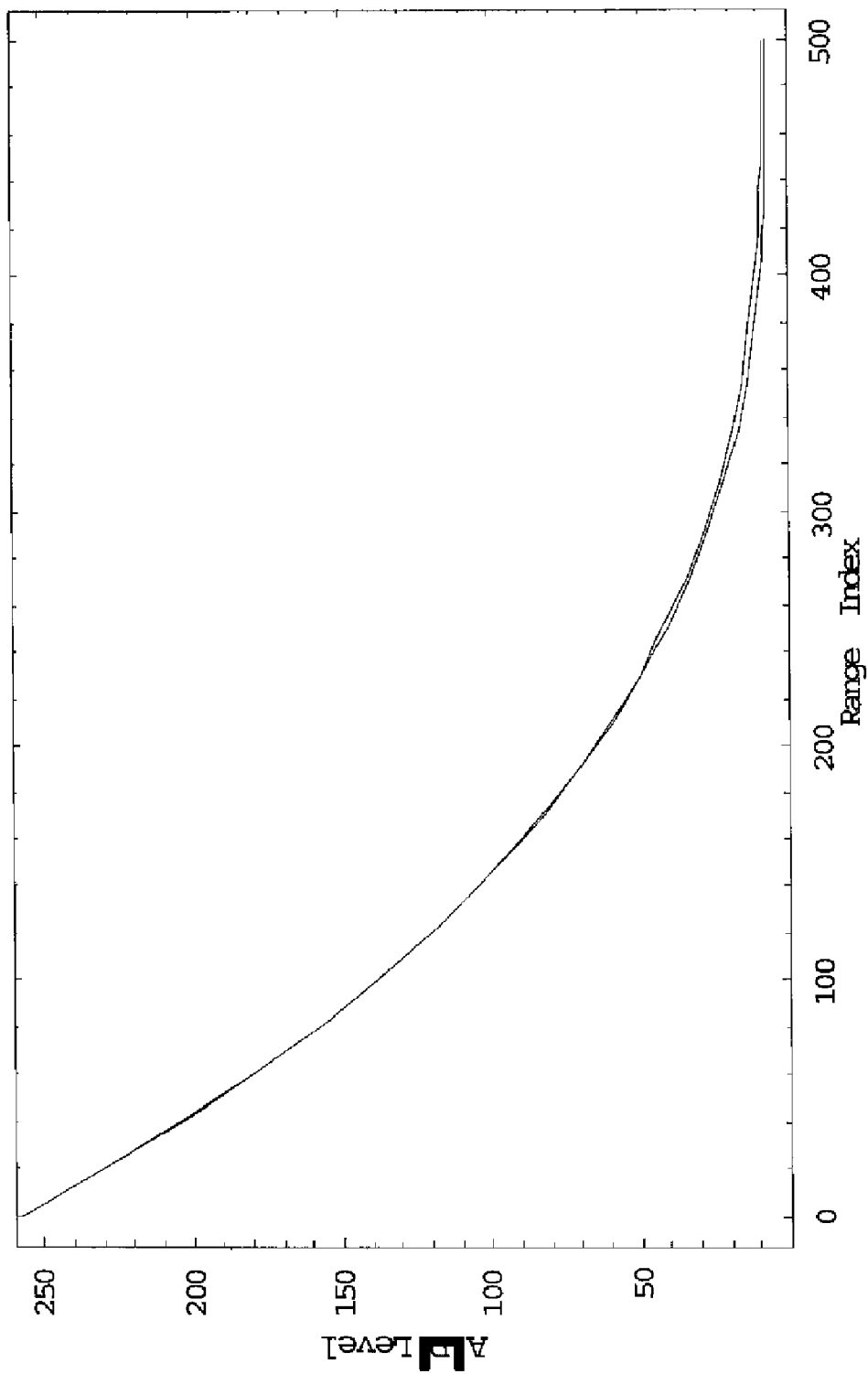
FIG. 7 is a graphical representation of a general-best-fit cubic compared to a special cubic.

FIG. 7 shows a comparison in voltage versus range index for the original 4-parameter fit and the best fit with a cubic of the form g(r) chosen so that f(0)=g(0). We used h=513. The maximum difference is quite small compared to the variability in the data. (Saying h=513 is interpreted as saying the range extent of sea clutter (that day) is 513×7.5=3847.5 meters=2.08 nautical miles (nm).)

Figure 8:
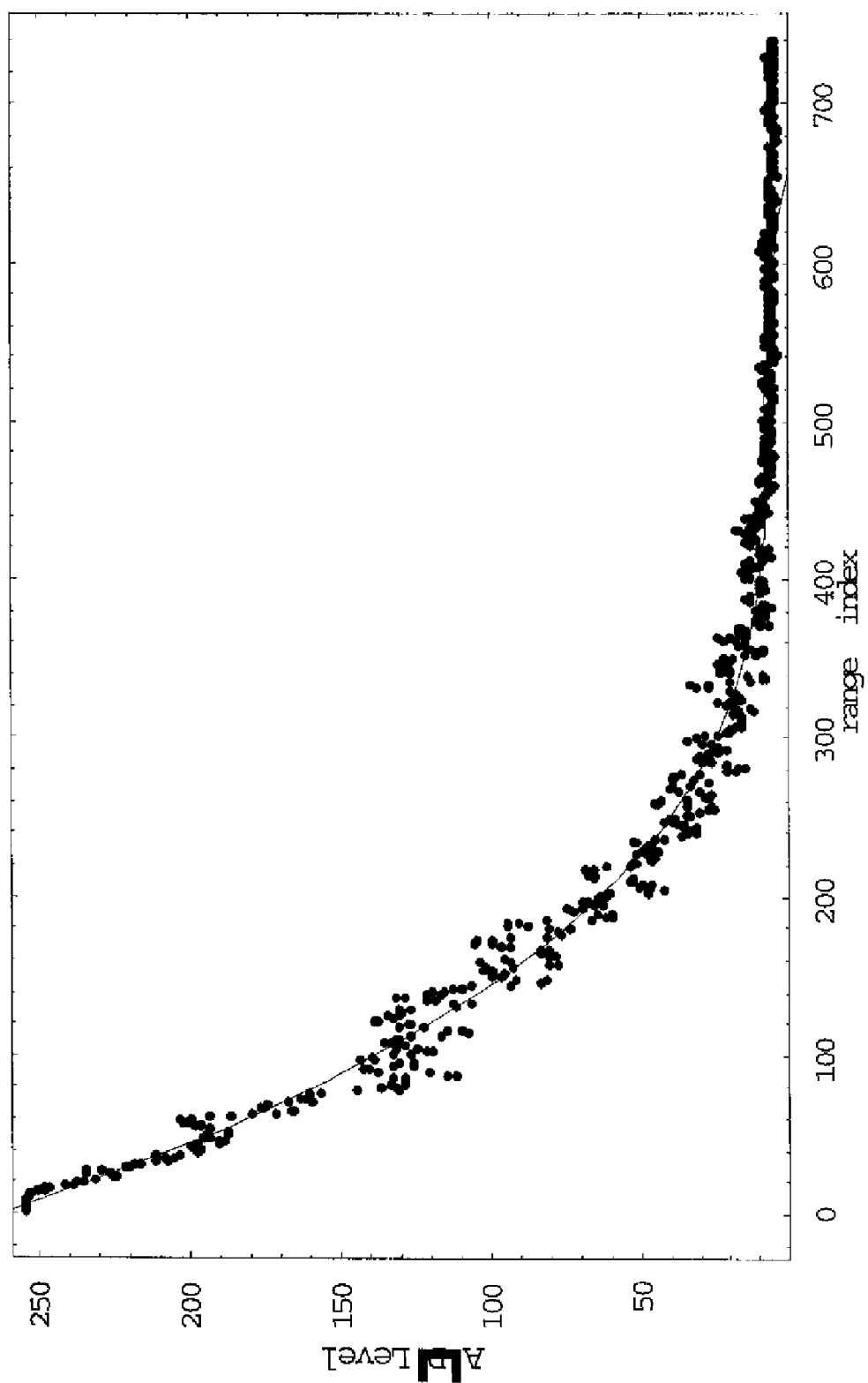
FIG. 8 is a graphical representation of a special cubic match to sea clutter profile.

FIG. 8 shows the range profile of sea clutter averaged over about 200 PRI and how well it fits to a cubic polynomial. The cubic polynomial in FIG. 8 is not the general 4 parameter least mean square fit to a cubic, but is of the form of g(r).

We denote by C(r) the mathematical model representing the mean sea clutter voltage range profile at the log-amp detector output of the radar receiver. We take as understood that the antenna of the radar is installed at a fixed height above the ocean surface and that C(r) will have to be adjusted for such things as sea state changes and changes in radar waveform.

Given a mean sea level Earth model (say a sphere or ellipsoid), there is a finite is line of sight range, H, from the antenna to the horizon. There can be no sea clutter from ranges beyond H. At any given time, there will be a range, r=h with 0<h<H, beyond which there is no detectable sea clutter return. When r>h, the average receiver output is the constant mean noise level, $\mu$. On calm days with an antenna height of about 20 meters, we have experienced a value of h near 2 nm while the range to the horizon is more like H=10 nm. As weather gets increasingly rough, h can get considerably closer to H.

The function C(r) models the mean sea clutter level over the range interval [0, h] for a particular installation in a particular environment and a fixed radar mode. For all r>h, we assert that C(r)=$\mu$. We take the following as axioms for our sea clutter voltage model as measured after the Log Amp of a Log-FTC receiver.

1) C(r) is continuous over [0, $\infty$), and moreover, has a continuous second derivative over (0, $\infty$);
2) C(r)$\geq$0 for all r;
3) C'(r)$\leq$0 over ($\epsilon$, $\infty$) for some small, positive $\epsilon$;
4) For some h, 0<h<H, C"(r)>0(C(r) is convex (concave up)) over ($\epsilon$', h) for some non-negative $\epsilon$';
5) C(r) is "maximally flat" at r=h;
6) With a=installed antenna height, C(r) restricted to the interval [a, h] is a cubic polynomial while for r>h, C(r)=$\mu$, the constant mean noise level.

In Axiom 1), we have departed from established radar references by asserting the continuity of C(r) at the origin. Traditional radar signal modeling as a power ratio includes a term with a singularity at r=0 ($r^4$ in the denominator) and a null in the numerator (from the antenna gain pattern among other things). Our axiom says these combine to form a removable singularity.

Of course, a weaker version of Axiom 1, asserting only the continuity of C(r) over the compact interval, is enough to conclude that C(r) can be approximated uniformly well by polynomials over [0, h]. It really doesn't matter if we assert the smoothness of the $\alpha$ priori clutter model C(r) since we get smoothness from the polynomial fit.

Axiom 2 is an arbitrary choice of sign for the detected voltage and is dependent on the electronic circuits used in the radar. We have a choice to take C(r)>0 for all r or to take C(r)<0 for all r. We arbitrarily chose the former. There is no loss in the following by choosing C(r)<0, *mutatis mutandis*.

Axiom 3 is derived from the assumption of an ocean surface that looks the same to the radar everywhere. Then, the physics say the return from identical reflectors farther from the radar will provide weaker echoes to the receiver. Narrow antenna elevation patterns may cause sea clutter to initially increase, but once the receiver is sampling returns from the main antenna beam, the return will steadily decrease until it reaches the level of receiver noise or the range extends beyond the horizon.

Note that we insisted that the clutter model function decrease forever. There is no need to worry past the horizon. By preventing the modeling function from popping up after H, we eliminate certain forms of cubic polynomials from consideration.

Axiom 4 is obvious from data and is in agreement with the established models based on the Radar Equation.

Axiom 5 is a geometrical assertion that C'(h)=C"(h)=0. This is not true for the models based on the radar equation because $1/r^p$ is never absolutely flat. But since h is quite large, the small, positive value of curvature of the range equation at r=h is not measurable within the ADC resolution of our radar.

Axiom 6 is based on the goodness of fit of cubic polynomials to our radar sea clutter data. At higher antenna installations (a>60 m) or in higher sea states (SS>>3), we have no basis for asserting Axiom 6. However, since classic models do not change their basic characteristics under these conditions, it is our expectation that extrapolation of cubic models under more extreme conditions will prove justified.

Having accepted that C(r) is a cubic polynomial satisfying Axioms 1 to 6, we can summarize a few elementary, albeit useful, conclusions.

Theorem. The cubic polynomial model C(r) for navigation radar sea clutter voltage is a cubic with a $3^{rd}$ order solution to the equation C(r)=$\mu$:

$$C(r) = \mu + \frac{(\xi - \mu)}{h^3}(h-r)^3.$$

Furthermore, in this representation, the three parameters, $\mu$, $\xi$, and h are all non-negative. The maximum range extent of sea clutter is represented by h, $\mu$ is the mean receiver noise level, and $\xi$=C(0) is the maximum clutter return.

Proof. As a cubic polynomial, the second derivative of C(r) is of first degree and has a single root. By axiom 5, we can write C"(r)=k(h−r) for some constant k, where k>0 by axiom 4. Thus, C'(r)=m−(k/2) $(h-r)^2$. Again by Axiom 5, m=0 and we reduce to C'(r)=(k/2) $(h-r)^2$. Integrating again, we get C(r)=n−(k/6) $(h-r)^3$. We also need $\mu$=C(h)=n and $\xi$=C(0)=n−(k/6)$h^3$. That's enough to give C(r) the form of the theorem. It is straightforward to verify that this form of cubic satisfies all of the axioms as long as we agree to set C(r)=$\mu$ whenever we have r>h.

We now take the special form of cubic C(r) from our theorem as the model for the mean sea clutter's range profile. Radars can use either one of two approaches with C(r) for their STC. The first approach is to subtract Max{(C(r)−$\mu$)0} from each PRI, truncating the results at 0 (or the mean noise level, $\mu$).

Figure 9:
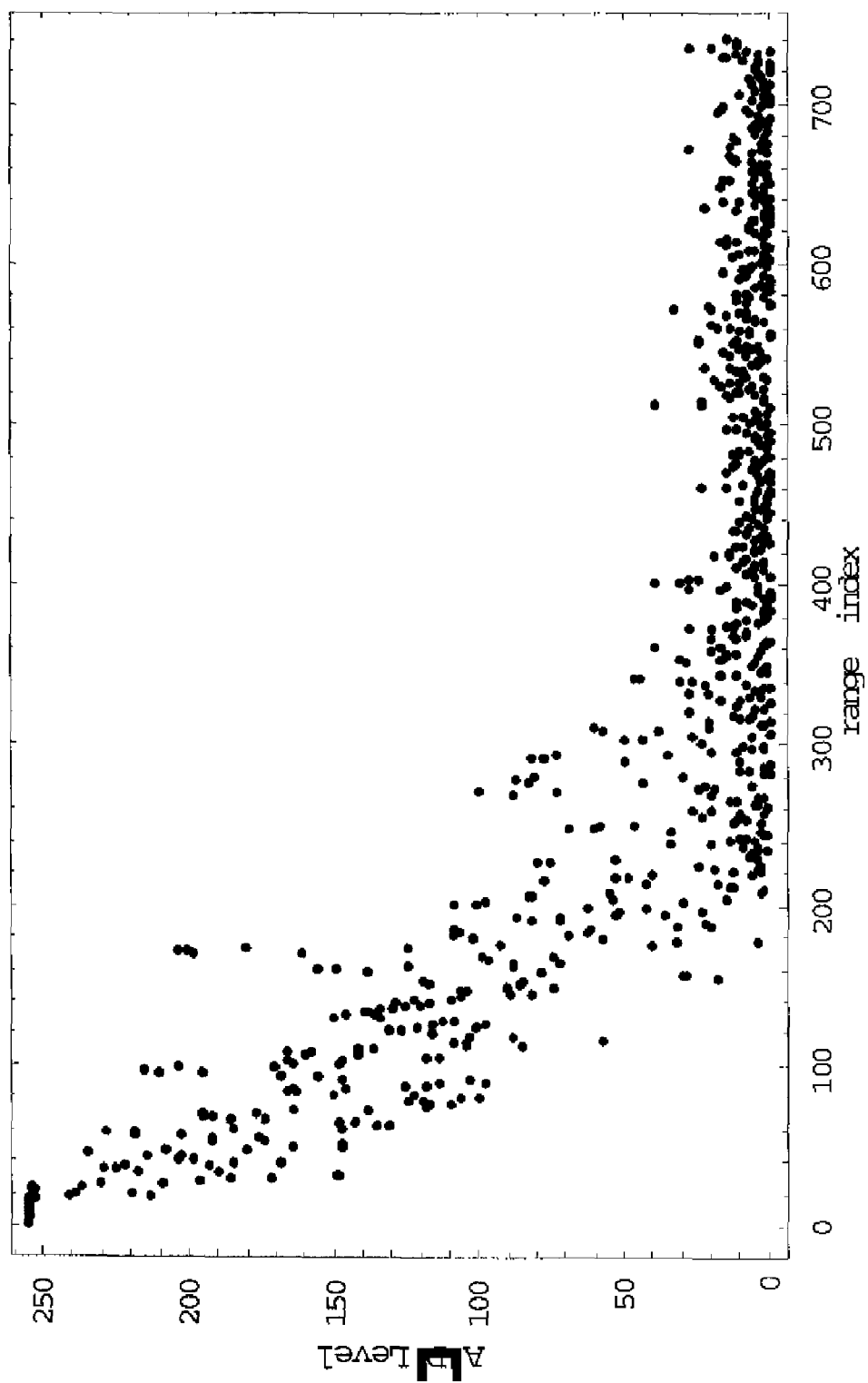
FIG. 9 is a graphical representation of another single PRI sea clutter range profile.
Figure 10:
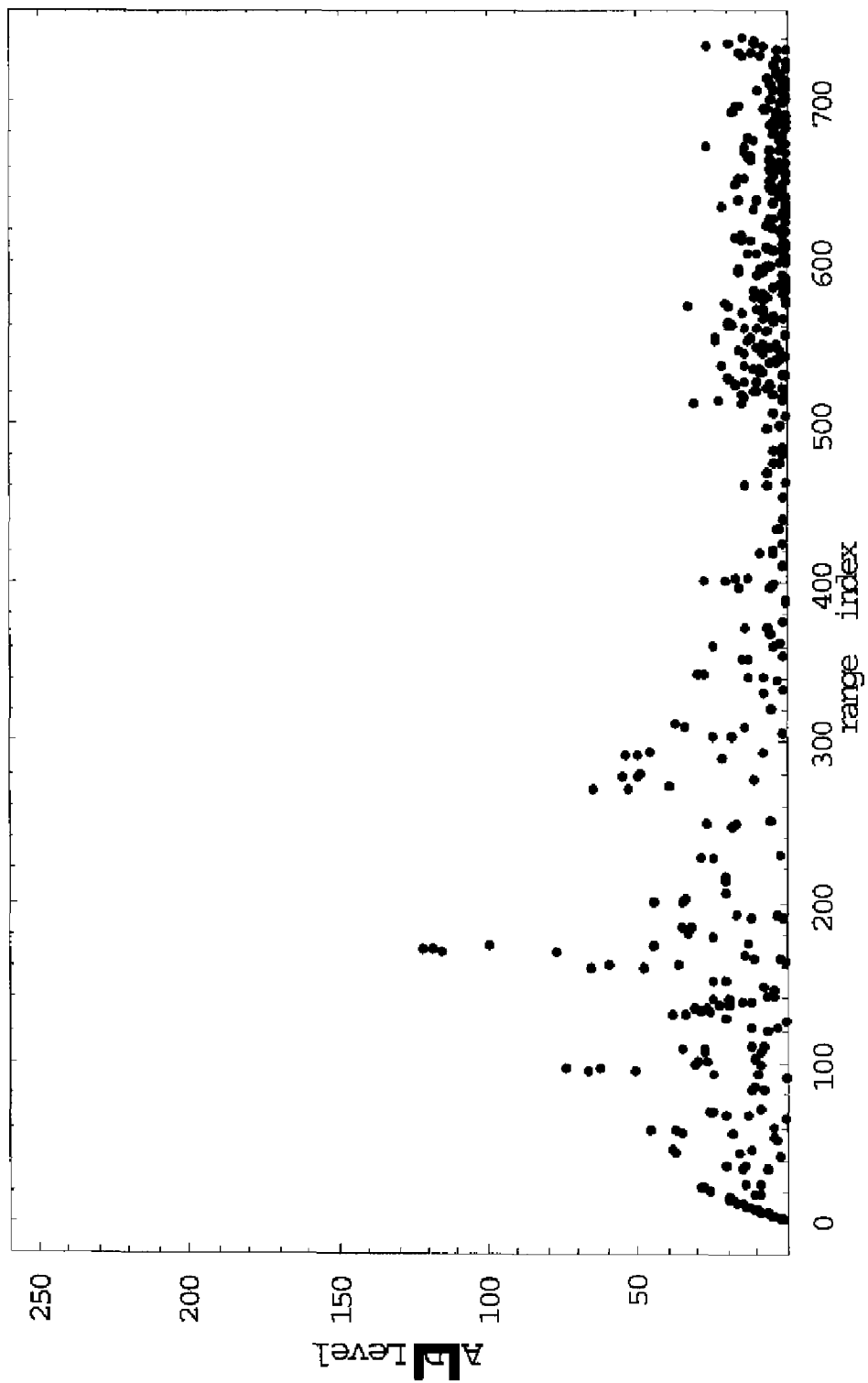
FIG. 10 is a graphical representation of a post STC—using a Subtractive technique.

FIGS. 9 and 10 exhibit a "before and after" view of a single PRI sea clutter range profile with such "subtractive STC". This approach results in a very nice flattening of the range profile, but the variability (instantaneous fluctuations) from range bin to range bin will be significantly higher over sea clutter than over receiver noise. If the thresholds that determine PPI pixel brightness are constant in range and low enough to see noise speckle on the PPI, this approach will result in considerable sea clutter residual on the PPI. Simply subtracting more does not improve the performance.

Another option is to multiply each PRI by a constant times the reciprocal of C(r). The product of a perfect match between the PRI and C would then be a constant function in range, and a high pass filter (FTC) will eliminate it. One purpose of the constant is to properly scale the product to maintain the result in the dynamic range of the ADC, between 0 and 255 in our FIGS. 2, 3 and 8-12. We don't want STC to affect the receiver output beyond the range of clutter, so for r>h, we demand that the multiplying factor be 1. The multiplying function we recommend is M(r):

$$M(r) = \text{Min}\left\{1, \text{Max}\left\{\frac{AP}{\xi}, \frac{\mu}{C(r)}\right\}\right\}.$$

Note that we will choose parameters so that $0<\mu \leq AP \leq \xi$. Hence, we have at long range, M(r)=1 and at short ranges, M(r)*C(r)≅AP (a constant). We call the parameter AP the "attack point" of the STC. The attack point determines how strongly the sea clutter is attenuated at short range.

A goal of this "attack-point-based multiplicative STC" is not to completely flatten the sea clutter profile, but merely to reduce the curvature of the profile so that FTC can eliminate any residual. This design approach to enhance log-FTC receivers has the desirable side-effect of performing well when sea clutter is not a perfect match to the expected profile. Imperfect matching can be due to either changes in environment or failure by the operator to optimally set the controls.

Figure 11:
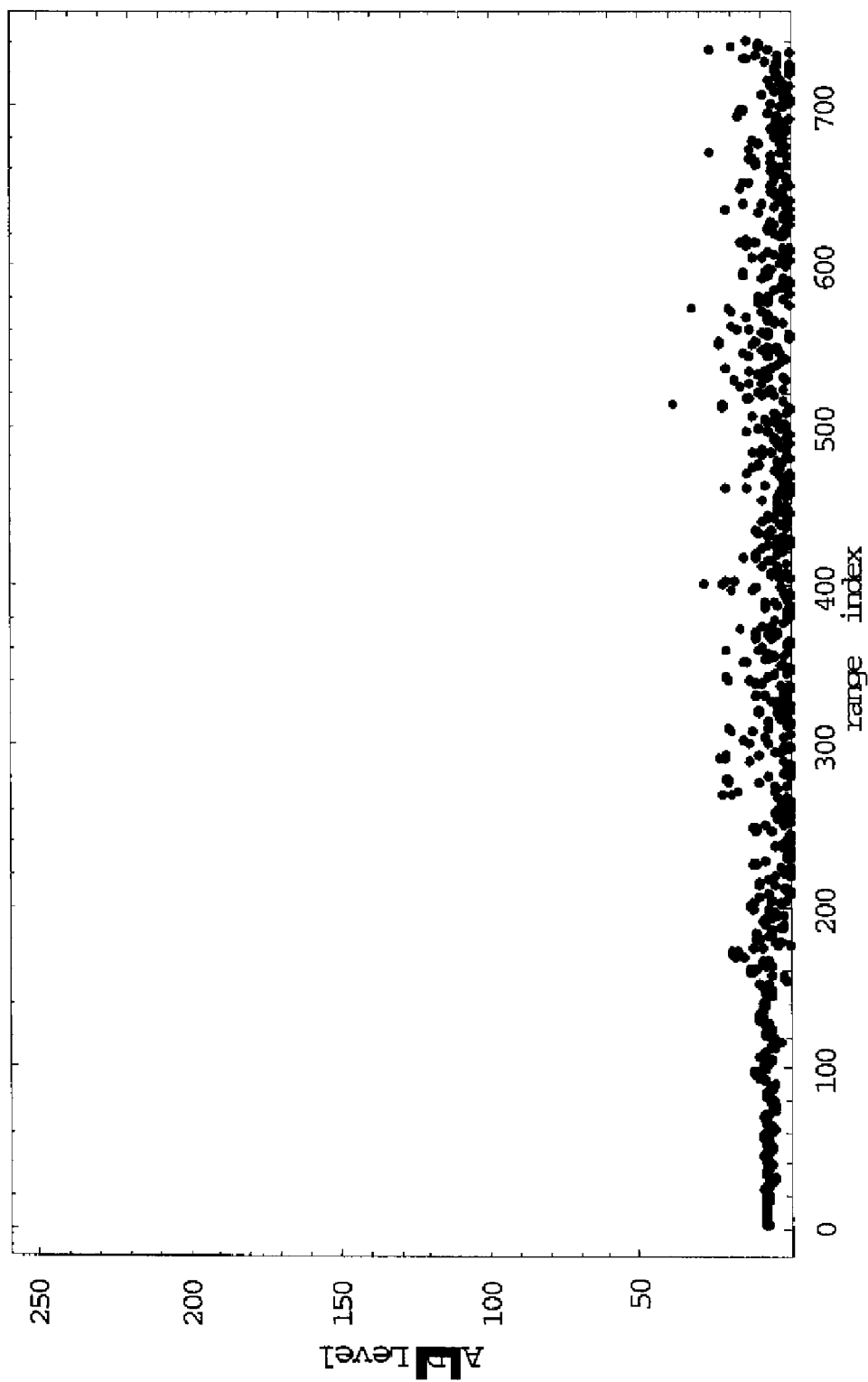
FIG. 11 is a graphical representation of a post STC—using multiplicative method where AP=Noise Level.
Figure 12:
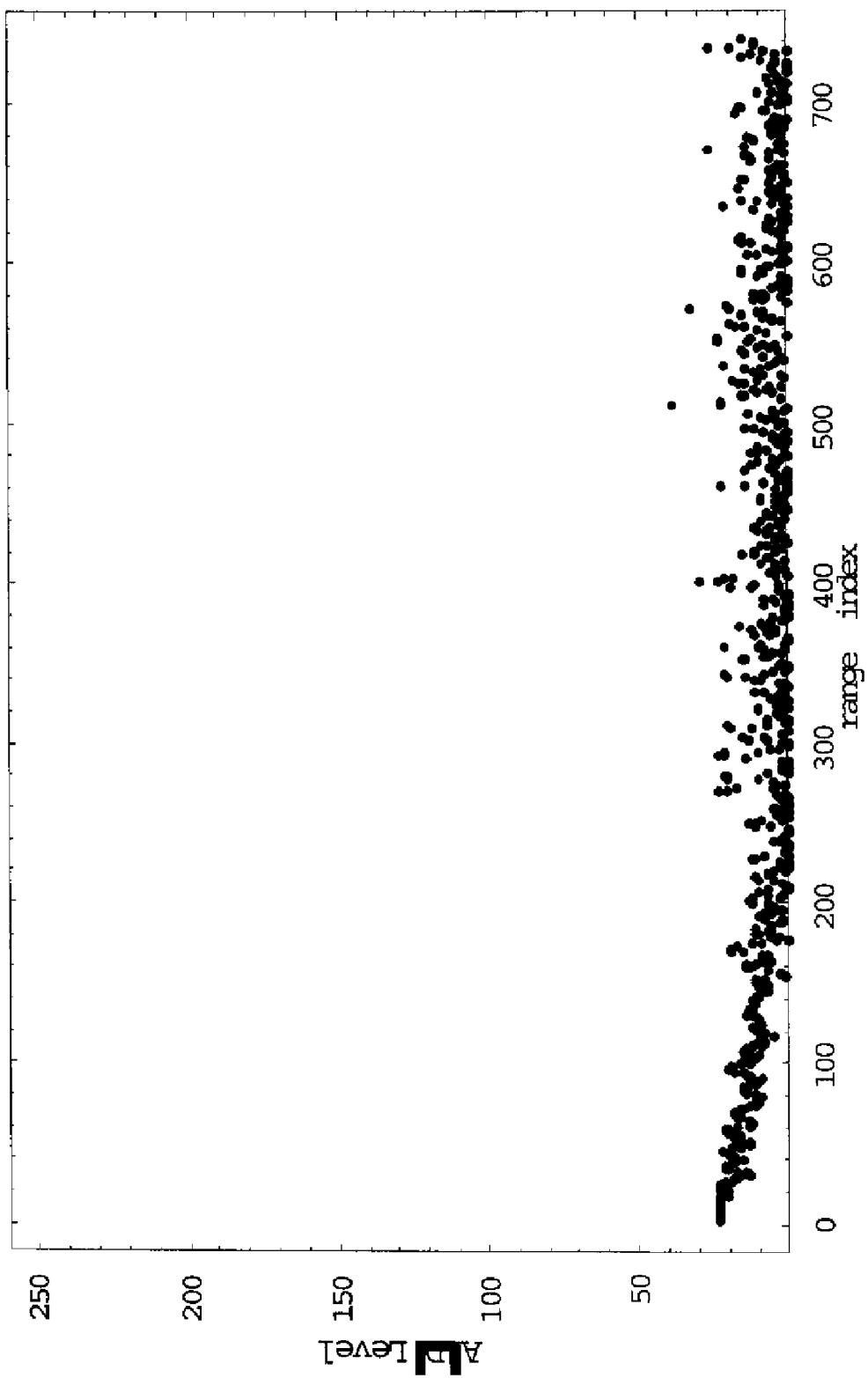
FIG. 12 is a graphical representation of a post STC—using multiplicative method where AP=3×Noise Level.

A remaining question is how to select AP so that the variation in sea clutter is reduced without being wiped out entirely. In FIGS. 11 and 12, we applied multiplicative STC to the same PRI as in FIG. 9. AP equals $\mu$ to get FIG. 11. AP equals 3$\mu$ to get FIG. 12. With AP=3$\mu$, the residual clutter is not fully attenuated and there is a visible slope to the clutter in the first 150 range bins of FIG. 12. However, this slope is gentle enough to be eliminated by FTC, yet the instantaneous fluctuations are significant enough to suggest that targets larger than the sea wave fluctuations could still be detected by the system.

Issues regarding multiplicative STC are now easily enumerated. The system provides a means to identify the model parameters: $\mu$, $\xi$, h and AP. Each of these parameters should be re-evaluated when the sea state or the radar mode changes.

The parameter $\mu$ is generally easily calibrated or measured, but there's a potential problem if operators can manipulate gain prior to STC. In an optimal design, gain makes a linear change in $\mu$, and that makes it easy to calibrate changes in the operator setting. Also, the mean noise level can change (in a predictable way) with receiver bandwidth. The bandwidth is usually a function of pulsewidth mode. So, it is possible, the parameter $\mu$ can be adjusted automatically for pulsewidth mode or operator gain changes after a simple system calibration. A similar argument holds for the sea clutter maximum value, $\xi$. Exemplary embodiments can change $\xi$ with sea state or pulsewidth mode.

The parameter h is determined by the range extent of sea clutter. One performance decision has to do with setting h to be constant at all antenna angles (azimuths) or allowing h to vary with azimuth. If h is allowed to vary, it will likely need to be changed with variations in wind direction as well as wind speed. An automated way of setting h would lead to better performance in cases where operators can't be relied on to constantly monitor for optimal performance.

The STC attack point, AP, is a function of the attenuation and detection sensitivity desired. Lower AP values reduce the false alarms due to clutter, but also reduce the ability of the system to detect small, close-in objects.

In general, we have a 4-parameter STC. The mean noise level, the range extent of sea clutter, and the peak clutter echo could be calibrated, measured by the system, or controlled by an operator. The attack point interacts with FTC and is probably best left to an operator STC control. Classic sea clutter models would indicate that, all else being equal, the peak clutter value and its range extent will both change by predictable amounts with sea state changes. Thus, there is a potential to adjust more than one parameter via that single control, say $\xi$, h, and AP. With $\mu$ calibrated, the radar operation for clutter reduction is relatively simple.

While exemplary embodiments of sea clutter modeling are shown and described in conjunction with a third order polynomial having three coefficients associated with specific physical parameters, other embodiments are contemplated in which different cubic forms are utilized as well as higher order polynomials having additional coefficients. We also anticipate that STC improvements based on our observations could be implemented before the Log Amp or in linear receivers. In this case, the STC curve generation would not be based on the reciprocal of a cubic polynomial, but rather on an exponential function that does not accurately reduce to polynomials. Prior to the Log Amp our clutter model has the form W(r) below:

W(r)=a $(e^{bC(r)}-1)$, where a and b are calibration parameters, and C(r) is a function of the type of our cubic polynomials.

It is understood that a metric for determining functions uses integration. A function F(r) can be used to model the radar sea clutter and C(r) is the cubic polynomial that best fits F(r) over the interval [0,h] in the least mean squared sense. If the integral of the absolute difference between F and C is quite small over the interval 0 to h, then F can be considered essentially the inventive sea clutter model: Int[|F(r)−C(r)|, r in [0,h]]<epsilon. That is, if after replacing F with C the radar operates with substantially similar performance, then the sea clutter modeling can be considered as essentially the same. In other words, performance can be compared by epsilon=h*C(h)=length of the range interval over which the cubic extends times the system mean noise level (C(h)). Then the integral criteria can be expressed as—the average absolute difference between F and a best fit cubic is less than system noise.

Figure 13:
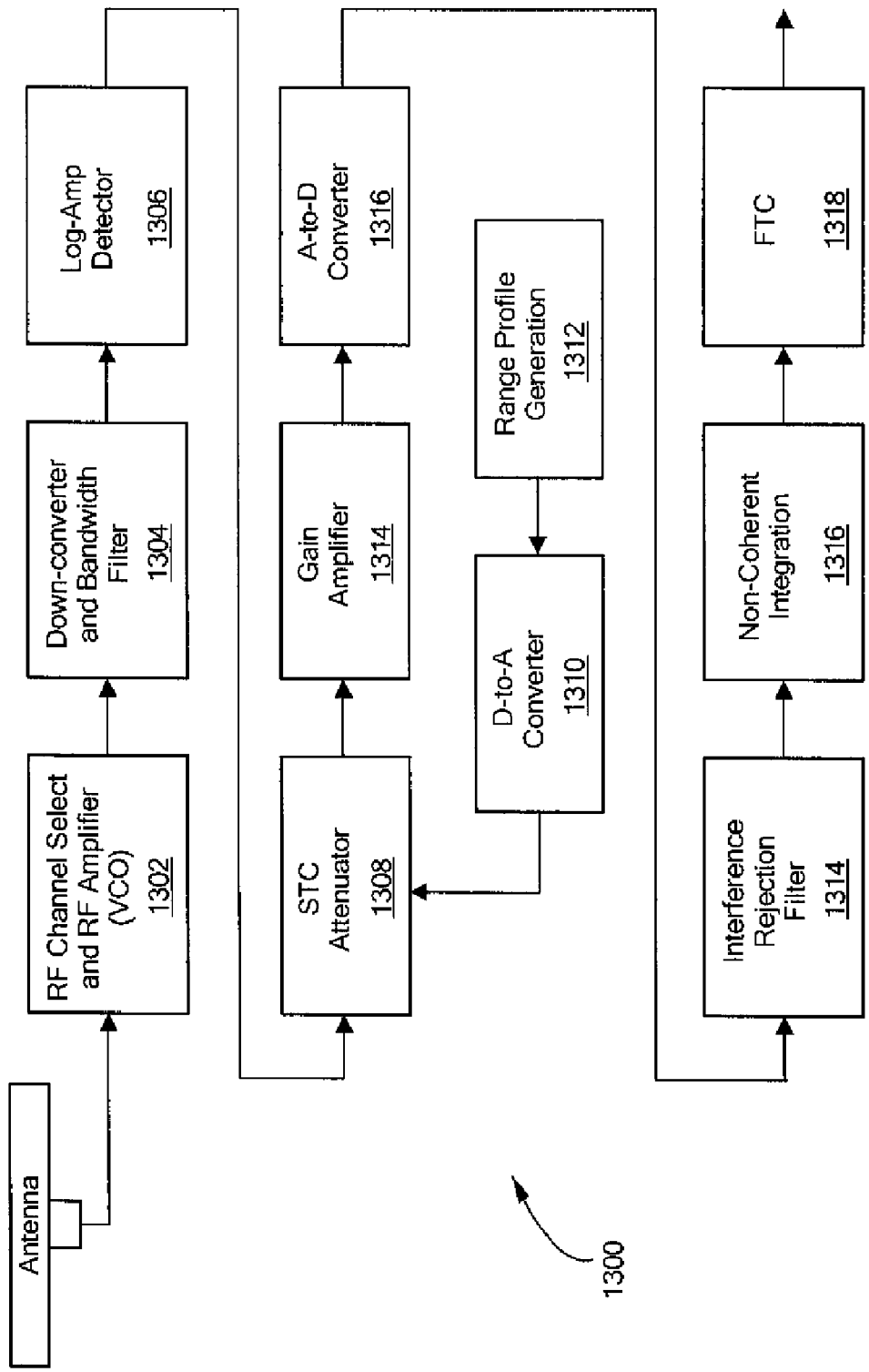
FIG. 13 is a block diagram of a radar system having sea clutter modeling in accordance with exemplary embodiments of the invention.

FIG. 13 shows an exemplary radar system 1300 to provide modeling sea clutter voltage with a cubic polynomial in accordance with exemplary embodiments of the invention. Some components may have similarity with those shown in FIG. 5. The system 1300 includes a RF channel select and RF amplifier 1302 coupled to a down-converter and bandwidth filter 1304 proving input to a Log-Amp detector 1306.

A STC attenuator 1308 utilizes inventive modeling of sea clutter voltage with a cubic polynomial. A range profile generation module 1310 provides data to a Digital-to-Analog Converter module 1312, which provides information to the STC attenuator 1308. The processing provided by these modules is described in detail above.

A gain amplifier 1314 receives output from the STC attenuator 1308 and provides data for digitization by an Analog-to-Digital converter module 1316. This data then passes through a interference rejection filter module 1314, a non-coherent integration module 1316, and an FTC module 1318.

Figure 13A:
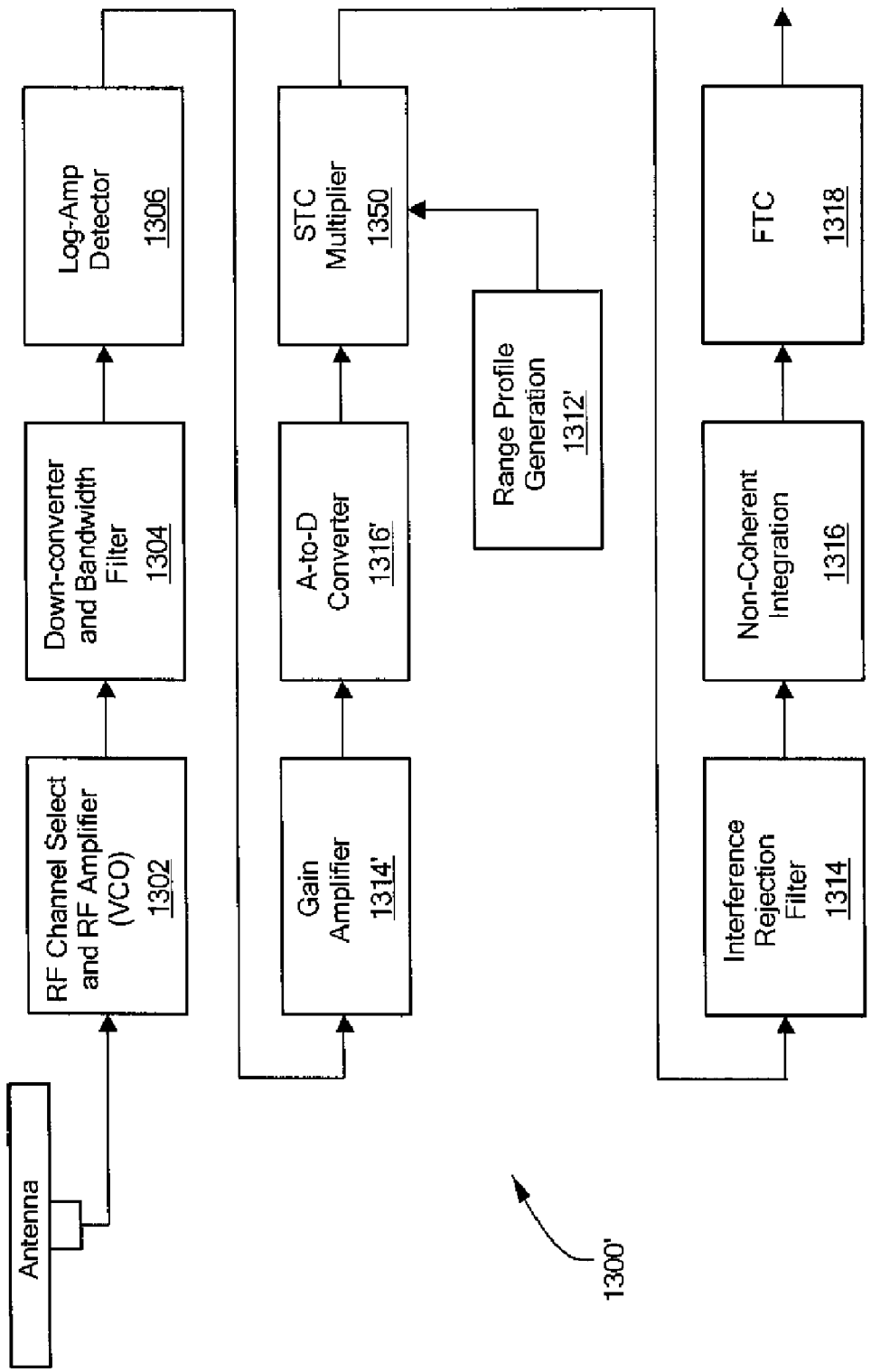
FIG. 13A is a block diagram of a further radar system having sea clutter modeling in accordance with exemplary embodiments of the invention.

FIG. 13A shows an alternative embodiment 1300' having some similarity with the system 1300 of FIG. 13 in which like reference numbers indicate like elements. The system 1300' incorporates inventive sea clutter modeling in a STC multiplier module 1350 using digitized data from the ADC module 1316'. A range profile generation module 1312' provides data to the STC multiplier module 1350. Processing then continues in the interference rejection filter 1314.

Figure 13B:
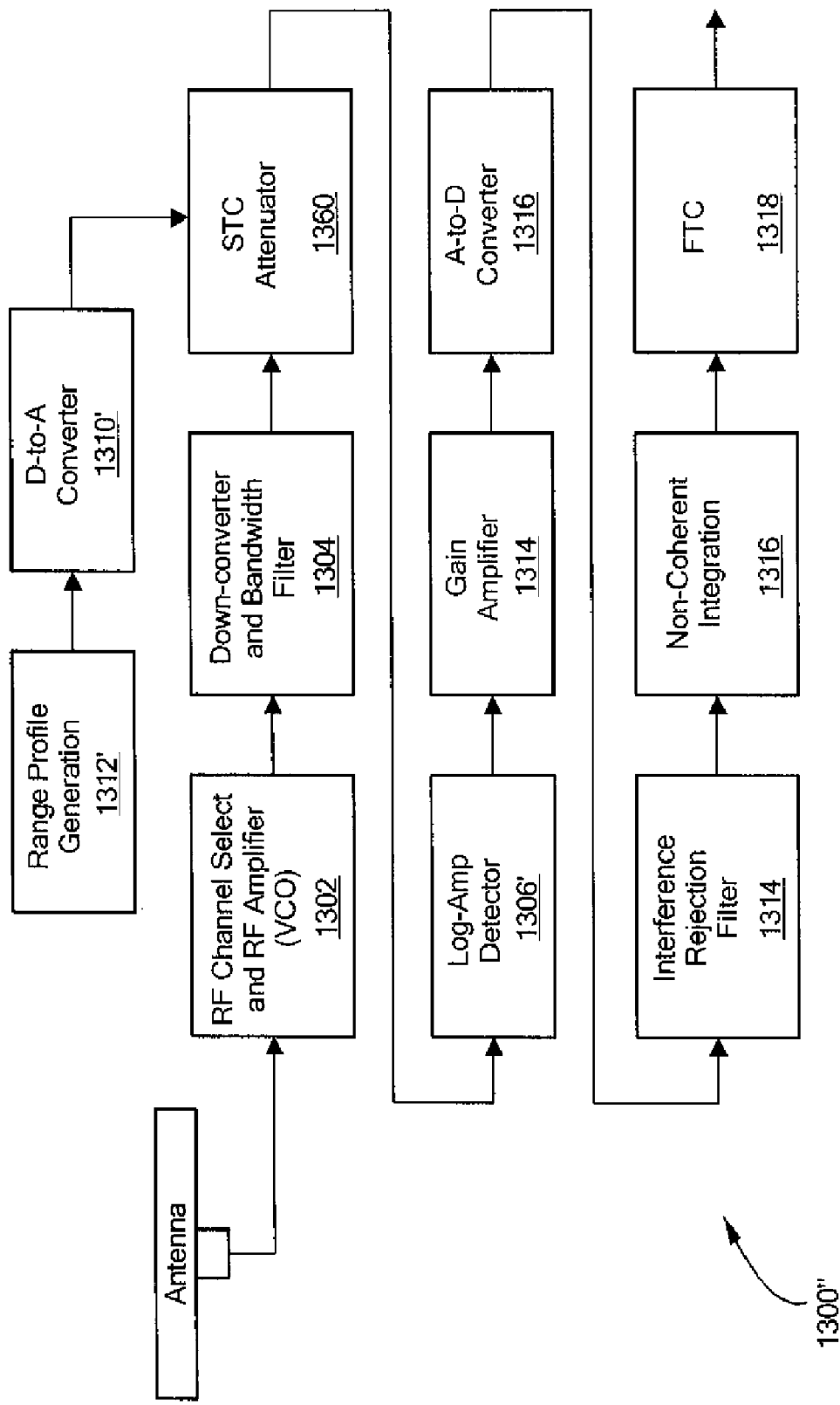
FIG. 13B is a block diagram of a another radar system having sea clutter modeling in accordance with exemplary embodiments of the invention.

FIG. 13B shows a further alternative embodiment 1300" having some similarity with the systems 1300, 1300' of FIGS. 13 and 13A. This system 1300" includes an STC attenuator module 1360 before the log-Amp detector 1306'. Range profile generation module 1312' information is converted to analog form by an DAC module 1310' coupled to the STC attenuator module 1360, which provides data to the log-Amp detector 1306'.

Figure 14:
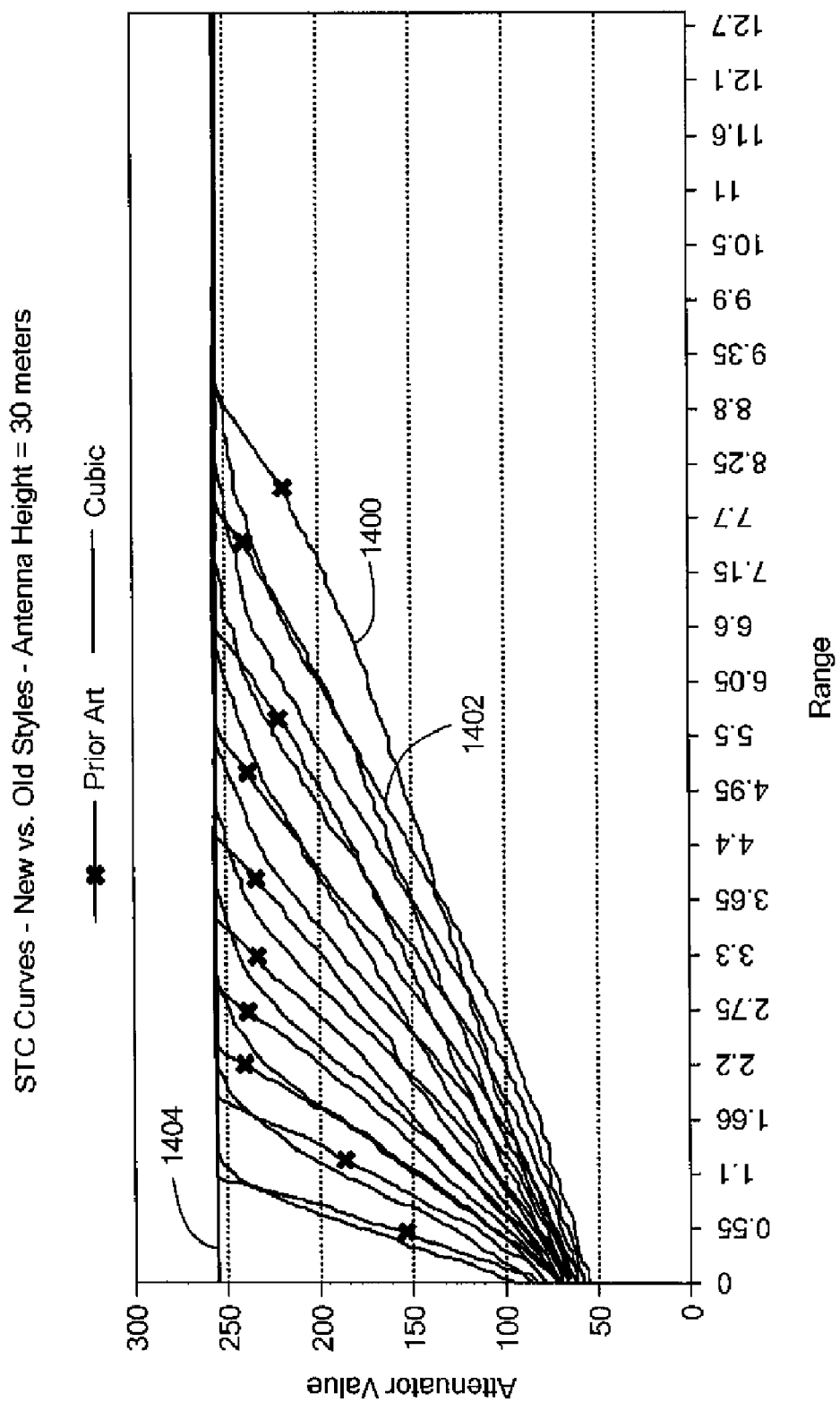
FIG. 14 is a graphical depiction of STC curves using prior art sea clutter modeling and STC curves using sea clutter modeling in accordance with exemplary embodiments of the invention.

FIG. 14 shows graphically comparative performance for a series of prior art STC curve 1400 using conventional sea clutter modeling and for a series of STC curves 1402 using inventive sea clutter modeling. Note that the unlike the 'clipping' that occurs on the prior art STC curve 1400. In contrast, the inventive STC curve 1402 gracefully falls off to the attenuator threshold 1404. As can be seen the concavity of the curves 1400, 1402 is opposite.

One skilled in the art will appreciate further features and advantages of the invention based on the above-described embodiments. Accordingly, the invention is not to be limited by what has been particularly shown and described, except as indicated by the appended claims. All publications and references cited herein are expressly incorporated herein by reference in their entirety.

What is claimed is:

1. A method, comprising:
    receiving signal return for a transmitted signal;
    processing the received signal return non-coherently including using a sea clutter model that models sea clutter voltage over range with a cubic polynomial;
    using the processed signal for target tracking; and
    outputting the processed signal return.

2. The method according to claim 1, further including displaying the processed signal return and the modeled sea clutter.

3. The method according to claim 1, wherein the cubic polynomial includes coefficients corresponding to physical parameters.

4. The method according to claim 1, wherein the cubic polynomial model C(r), where r is range, for navigation sea clutter voltage is a cubic with a $3^{rd}$ order solution to the equation $C(r)=\mu$, wherein $\mu$ is mean receiver noise level:

$$C(r) = \mu + \frac{(\xi - \mu)}{h^3}(h - r)^3,$$

where, $\mu$, $\xi$, and h are all non-negative, the maximum range extent of sea clutter is represented by h, $\mu$ is the mean receiver noise level, and $\xi=C(0)$ is the maximum clutter return.

5. The method according to claim 4, further including truncation of the cubic polynomial at a point h, where sea clutter meets mean noise level.

6. The method according to claim 5, further including changing one or more of the coefficients based upon sea state information.

7. The method according to claim 6, further including altering h based upon wind information.

8. The method according to claim 4, further including providing four-parameter sensitivity time control (STC) in which three parameters correspond to the three polynomial coefficients and a fourth parameter corresponds to an attack point, which is a function of attenuation and detection sensitivity.

9. The method according to claim 8, further including performing subtractive STC.

10. The method according to claim 8, further including performing attack-point-based multiplicative STC.

11. The method according to claim 1, where the cubic polynomial has the form $C(r)=(a+br+cr^2)(d-r)$, where the quadratic term is irreducible.

12. The method according to claim 1, wherein the step of outputting includes displaying via plan position indicator.

13. An article, comprising:
    a computer readable medium containing stored instructions to enable a computer to perform:
    receiving signal return for a transmitted signal;
    processing the received signal return non-coherently including using a sea clutter model that models sea clutter voltage over range with a cubic polynomial using the processed signal for target tracking; and
    outputting the processed signal return.

14. The article according to claim 13, further including instructions for displaying the processed signal return and the modeled sea clutter.

15. The article according to claim 13, wherein the cubic polynomial includes coefficients corresponding to physical parameters.

16. The article according to claim 13, wherein the cubic polynomial model C(r), where r is range, for navigation sea clutter voltage is a cubic with a $3^{rd}$ order solution to the equation $C(r)=\mu$, wherein $\mu$ is mean receiver noise level:

$$C(r) = \mu + \frac{(\xi - \mu)}{h^3}(h - r)^3,$$

where, $\mu$, $\xi$, and h are all non-negative, the maximum range extent of sea clutter is represented by h, $\mu$ is the mean receiver noise level, and $\xi=C(0)$ is the maximum clutter return.

17. The article according to claim 16, further including providing four-parameter sensitivity time control (STC) in which three parameters correspond to the three polynomial coefficients and a fourth parameter corresponds to an attack point, which is a function of attenuation and detection sensitivity.

18. A radar system, comprising:
    a receiver to receive signal return for a transmitted signal;
    a signal processing module to non-coherently process the signal return;
    a sea clutter modeling module to model sea clutter over range with a cubic polynomial for the signal return; and
    a display to display information corresponding to the processed signal return.

19. The system according to claim 18, wherein the cubic polynomial model C(r), where r is range, for navigation sea clutter voltage is a cubic with a $3^{rd}$ order solution to the equation $C(r)=\mu$, wherein $\mu$ is mean receiver noise level:

$$C(r) = \mu + \frac{(\xi - \mu)}{h^3}(h - r)^3.$$

where, $\mu$, $\xi$, and h are all non-negative, the maximum range extent of sea clutter is represented by h, $\mu$ is the mean receiver noise level, and $\xi=C(0)$ is the maximum clutter return.

20. The system according to claim 18, further including a four-parameter sensitivity time control (STC) in which three parameters correspond to the three polynomial coefficients and a fourth parameter corresponds to an attack point, which is a function of attenuation and detection sensitivity.

* * * * *

UNITED STATES PATENT AND TRADEMARK OFFICE
CERTIFICATE OF CORRECTION

| | | |
|---|---|---|
| PATENT NO. | : 7,796,082 B2 | Page 1 of 1 |
| APPLICATION NO. | : 11/672813 | |
| DATED | : September 14, 2010 | |
| INVENTOR(S) | : Wood | |

It is certified that error appears in the above-identified patent and that said Letters Patent is hereby corrected as shown below:

Col. 3, line 4, delete "a another" and replace with -- another --.

Col. 8, line 56, delete "A" and replace with -- $\Delta$ --.

Col. 8, line 57, delete "f(r)" and replace with -- f'(r) --.

Col. 9, line 38, delete "C(r) $\geq$ for" and replace with -- C(r) $\geq$ 0 for --.

Col. 10, line 55, delete "{(c(r)-µ)0}" and replace with -- {(c(r)-µ), 0} --.

Col. 13, line 6, delete "curve" and replace with -- curves --.

Col. 13, line 10, delete "curve" and replace with -- curves --.

Signed and Sealed this
Twenty-fifth Day of January, 2011

David J. Kappos
*Director of the United States Patent and Trademark Office*